UNITED STATES PATENT OFFICE.

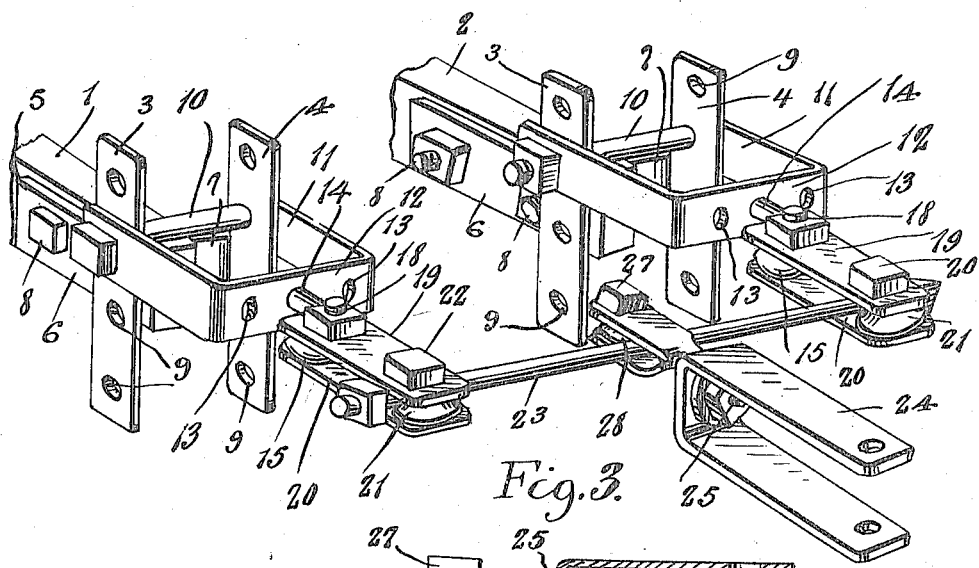
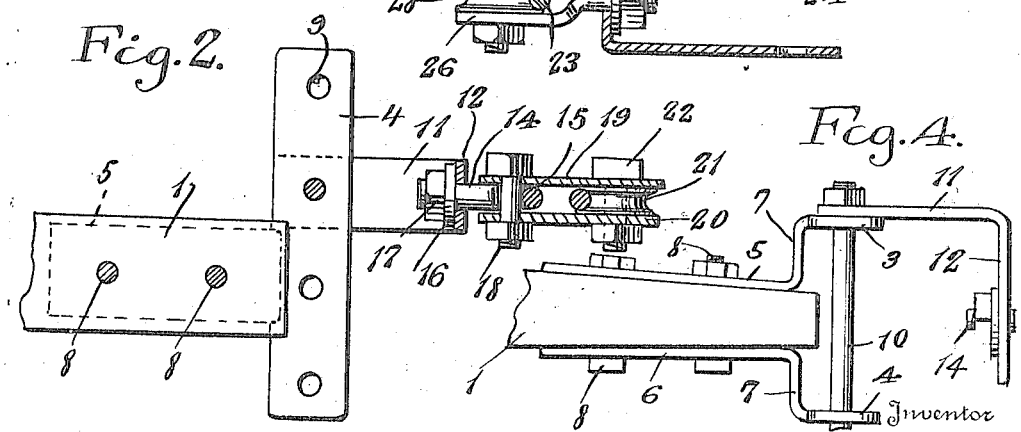

WILLIAM E. L. HARBOUR, OF EATON, COLORADO.

HITCH FOR TWO-WAY PLOWS.

1,266,799.   Specification of Letters Patent.   Patented May 21, 1918.

Application filed November 16, 1917. Serial No. 202,315.

*To all whom it may concern:*

Be it known that I, WILLIAM E. L. HARBOUR, a citizen of the United States, residing at Eaton, in the county of Weld and State of Colorado have invented certain new and useful Improvements in Hitches for Two-Way Plows; and I do hereby declare the following to be a full, clear, and exact description of the invention, such as will enable others skilled in the art to which it appertains to make and use the same.

This invention relates to a hitch for two way plows of the conventional type, and the primary object of the invention is to provide a hitch which will permit of movement of the draft tree engaging clevis with respect to the beams of the plow in any direction except longitudinally of the beam and yet maintain a practical direct pull connection between the forward ends of the beam and the draft animals, and also to insure a prompt automatic shift of the position of the draft tree or line of pull upon alteration of the line of draft of the plow.

In describing the invention in detail, reference will be had to the accompanying drawing wherein like characters designate like and corresponding parts throughout the several views, and in which:

Figure 1 is a perspective view of the improved hitch.

Fig. 2 is a fragmentary vertical section through the hitch illustrating the direct connection with the forward ends of the beams.

Fig. 3 is a fragmentary vertical section through the hitch showing the connection with the draft tree engaging clevis, and Fig. 4 is a fragmentary top plan view of the improved clevis.

Referring more particularly to the drawings, 1 and 2 designate the plow beams of an ordinary two way plow to the forward end of each of which beams are connected a pair of vertically positioned bars 3 and 4. The bars 3 and 4 have horizontally extending bars 5 and 6 connected thereto respectively, which bars are preferably formed integrally with the vertical bars 3 and 4, being bent as shown at 7 to position the greater length thereof for facial engagement with the sides of the beams, to which beams they are connected by means of suitable bolts 8. The bars 3 and 4 are provided with a plurality of vertically spaced openings 9 any alining pair of which receive a bolt 10 which connects a U-shaped strap 11 to the bars 3 and 4 and consequently to the forward end of the beam. The vertically spaced openings 9 permit of manual vertical adjustment of the U-shaped strap 11 with respect to the forward end of the beam to which it is connected. The bight portion 12 of the U-shaped bar 11 is provided with a plurality of spaced openings 13. The shank 14 is rotatably positioned within one of the openings 13 and is held therein by means of a washer 16 and nut 17 which is mounted upon the threaded end of the shank 14. The eye 15 of the eye bolt has a bolt 18 extending vertically therethrough which bolt connects a pair of horizontally positioned bars 19 and 20 to the U-shaped bar 11. The openings 13 which are spaced horizontally within the bight portions 12 permit of manual lateral adjustment of the connected pairs of bars 19 and 20 with respect to each other to properly adjust the hitch connection with the beams 1 and 2 in accordance with different sized horses or draft animals. The bars 19 and 20 of each pair are spaced from each other and a roller 21 having a concaved face is mounted between their outer ends and rotatably supported by the bolt 22. A rod 23 extends slidably between the pairs of connected plates 19 and 20, from one set to the other as clearly shown in Fig. 1 of the drawing and it engages the rollers 21 rearwardly of the center of the rollers and consequently positioning the rods behind these rollers. The draft tree engaging clevis 24 is swivelly connected to the shank 25 of a forked member 26. A bolt 27 is carried by the forked ends 10 of the member 26. It rotatably supports a wheel or roller 28 which is positioned between the arms of the forked ends. The rod 23 engages the roller 28 forward of its center, as clearly shown in Figs. 1 and 3 of the drawing.

The rod 23 is permitted limited longitudinal movement between the beams 1 and 2, and also limited forward and rearward movement between the plates, while the rollers 28 engaging the rod permit movement of the clevis 24 longitudinally of the rod or laterally between the beams 1 and 2. The swiveled connection between the clevis and the forked member 26 permits of turning movement of the draft tree which may be connected to the clevis while the position of the rods between the arms of the forked member permit of vertical pivotal movement of the clevis. The U-shaped members 11 being pivotally connected to the bars 3 and 4 vertical pivotal movement is permitted at this point and the eye bolt 15 at its connection with the U-shaped bars 11 permits of a flexible movement of these members and consequently the sets of plates or bars 19 and 20 carried thereby so that the entire hitch structure is provided to permit of relative flexibility to insure prompt automatic or self adjustment of the clevis, and consequently the line of pull, upon alteration of the line of draft of the plow so as to cause the pull to be administered to the proper portion of the plow for the equalization of the draft thereof while the openings 9 and 13 permit of manual vertical adjustment and manual lateral adjustment of the hitch structure relative to the plow beam.

From the foregoing description taken in connection with the accompanying drawings the advantages of construction and the method of operation of the improved hitch for two-way plows, will be readily apparent to those skilled in the art to which this invention appertains and, while in the foregoing description, the principle of the operation of this invention has been described together with various features of construction, it is to be understood that certain minor features of construction, combination and arrangement of parts may be altered to suit practical conditions provided such alterations are comprehended within the scope of what is claimed.

What I claim as new is:—

1. In a hitch for two-way plows, the combination with a pair of beams, of a pair of vertical bars attached to each of said beams, a U-shaped bar pivotally connected for vertical pivotal movement and for manual vertical adjusted movement with relation to said vertical bars, an eyebolt connected to each of said U-shaped bars for manual lateral adjustment with relation thereto, a pair of bars connected to each of said eyebolts for lateral pivotal movement with relation to the eyebolts, a rod positioned between the bars of each of said pair of bars for limited movement laterally of the beam, a forked member carried by said rod for movement longitudinally along the rod, and a draft tree engaging clevis swivelly connected to said forked member.

2. In a hitch for two way plows, the combination with a pair of plow beams, of a support attached to the forward end of each beam, a strap pivotally connected to each support for vertically adjustment with respect to the support, a rod guide swivelly connected to each strap for lateral adjustment with relation thereto, a rod slidably carried by said guides and extending between the beams, said guides supporting said rods to permit longitudinal movement of the rods transversely to the beams and limited transverse movement of the rods longitudinally of the direction of travel of the beams, and a clevis carried by said rod for movement along the rod.

3. In a hitch for two way plows, the combination with a pair of plow beams, of a support attached to the forward end of each beam, a strap pivotally connected to each support for vertical adjustment with respect to the support, a guide swivelly connected to each strap for lateral adjustment with relation thereto, and clevis supporting means connected to said guides.

4. In a hitch for two way plows, the combination with a pair of plow beams, of a support attached to the forward end of each beam, a strap pivotally connected to each support for vertical adjustment with respect to the support, a rod guide connected to each strap for lateral adjustment with relation thereto, a rod carried by said guide and extending between the beams, said guides supporting said rod to permit longitudinal movement of the rod transversely to the beams and limited transverse movement of the rod longitudinally of the direction of travel of the beams, and a clevis carried by said rod.

In testimony whereof I affix my signature in presence of two witnesses.

WILLIAM E. L. HARBOUR.

Witnesses:
T. C. PHILLIPS,
W. H. SCHEER.

Copies of this patent may be obtained for five cents each, by addressing the "Commissioner of Patents, Washington, D. C."